(12) United States Patent
Xu et al.

(10) Patent No.: US 7,934,731 B2
(45) Date of Patent: May 3, 2011

(54) BRAKING DEVICE FOR PLAYARD

(75) Inventors: Hong-Bin Xu, Taipei (TW); Xiao-Hong Xiao, Taipei (TW)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 408 days.

(21) Appl. No.: 12/186,504

(22) Filed: Aug. 5, 2008

(65) Prior Publication Data
US 2009/0039608 A1  Feb. 12, 2009

Related U.S. Application Data

(60) Provisional application No. 60/954,306, filed on Aug. 6, 2007.

(51) Int. Cl.
*B62B 1/00* (2006.01)
(52) U.S. Cl. ............... 280/79.2; 280/33.997; 188/19
(58) Field of Classification Search ............. 280/30, 280/37, 47.371, 47.35, 655.1, 651, 659, 79.2, 280/33.997, 33.991, DIG. 4; 5/93.1, 93.2, 5/94, 99.1; 188/19, 29, 20, 2 D
See application file for complete search history.

(56) References Cited

U.S. PATENT DOCUMENTS

| | | | | |
|---|---|---|---|---|
| 2,544,099 | A * | 3/1951 | Malin | 280/47.35 |
| 4,976,447 | A * | 12/1990 | Batson | 280/33.994 |
| 5,125,674 | A * | 6/1992 | Manuszak | 280/30 |
| 5,906,383 | A * | 5/1999 | Cortes | 280/47.371 |
| 5,957,436 | A * | 9/1999 | Ristau | 5/99.1 |
| 6,123,343 | A * | 9/2000 | Nolting et al. | 280/33.994 |
| 7,396,026 | B1 * | 7/2008 | Munson | 280/33.994 |
| 2005/0275195 | A1 * | 12/2005 | Matula et al. | 280/651 |
| 2008/0111329 | A1 * | 5/2008 | Brown et al. | 280/33.997 |
| 2008/0209631 | A1 * | 9/2008 | Thomas et al. | 5/99.1 |

* cited by examiner

*Primary Examiner* — Hau V Phan
(74) *Attorney, Agent, or Firm* — Winston Hsu; Scott Margo

(57) ABSTRACT

A control unit is slidably mounted on a top corner of a playard and connected to the slider inside the seat through a linking unit passing through a standing post of the playard. When the control unit pulls the slider to move relative to the seat along a first direction, a braking pin slides relative to the seat along a second direction and disengages from the hub to release a wheel. When the control unit is pushed to lock the wheel, the bias force from springs moves the slider and the braking pin to slide along the opposite direction, leading the braking pin to engage with the hub to brake the wheel. The wheel can be operated to brake or release by a remote control unit.

20 Claims, 5 Drawing Sheets

BRAKING DEVICE FOR PLAYARD

CROSS REFERENCE TO RELATED APPLICATIONS

This application claims the benefit of U.S. Provisional Application No. 60/954,306, which was filed on Aug. 6, 2007, and is incorporated herein by reference.

BACKGROUND OF THE INVENTION

1. Field of the Invention

The present invention relates to a braking device, and more particularly, to a braking device used for a playard that is remote controlled by the playard.

2. Description of the Prior Art

Generally, when a playard is opened as a using status, four wheels are configured at the bottom of each standing post at four corners of the playard so that the playard is easy to move. After moving the playard to a desired position, braking devices on one or more than one wheel can be operated to stop the wheels and prevent the playard from moving unintentionally.

Most braking devices of the playard according to the prior art have coupling component for the wheels, which requires a user to bend down to operate the braking device of the playard manually with hand or to step on the braking device with foot that might cause injury to the hand or the foot of the user. On the other hand, foot operation usually is not as easy as hand operation and sometimes causes more inconvenience.

SUMMARY OF THE INVENTION

The present invention provides a braking device for a playard that has a standing post. The braking device includes a seat mounted at the bottom end of the standing post wherein a wheel of the playard is rotatably connected to the seat, an engaging unit mounted at the seat and capable of moving between a releasing position and a braking position relative to the seat, a control unit configured at a place of the playard remote from the seat and set in an unlocking position or a locking position, and a linking unit passing through the standing post of the playard and connecting to the engaging unit and the control unit with its two ends respectively. When the control unit is moved to the locking position, the engaging unit is brought to the braking position for engaging with the wheel via the linking unit; when the control unit is moved to the unlocking position, the engaging unit is brought to the releasing position for disengaging from the wheel via the linking unit.

The present invention also provides a playard. The playard includes a standing post, a wheel, and a braking device. The braking device includes a seat mounted at the bottom end of the standing post wherein the wheel is rotatably connected to the seat, an engaging unit mounted at the seat and capable of moving between a releasing position and a braking position relative to the seat, a control unit configured at a place of the playard remote from the seat and selectively set in an unlocking position or a locking position, and a linking unit passing through the standing post and connecting to the engaging unit and the control unit with its two ends respectively. When the control unit is moved to the locking position, the engaging unit is brought to the braking position for engaging with the wheel via the linking unit; when the control unit is moved to the unlocking position, the engaging unit is brought to the releasing position for disengaging from the wheel via the linking unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
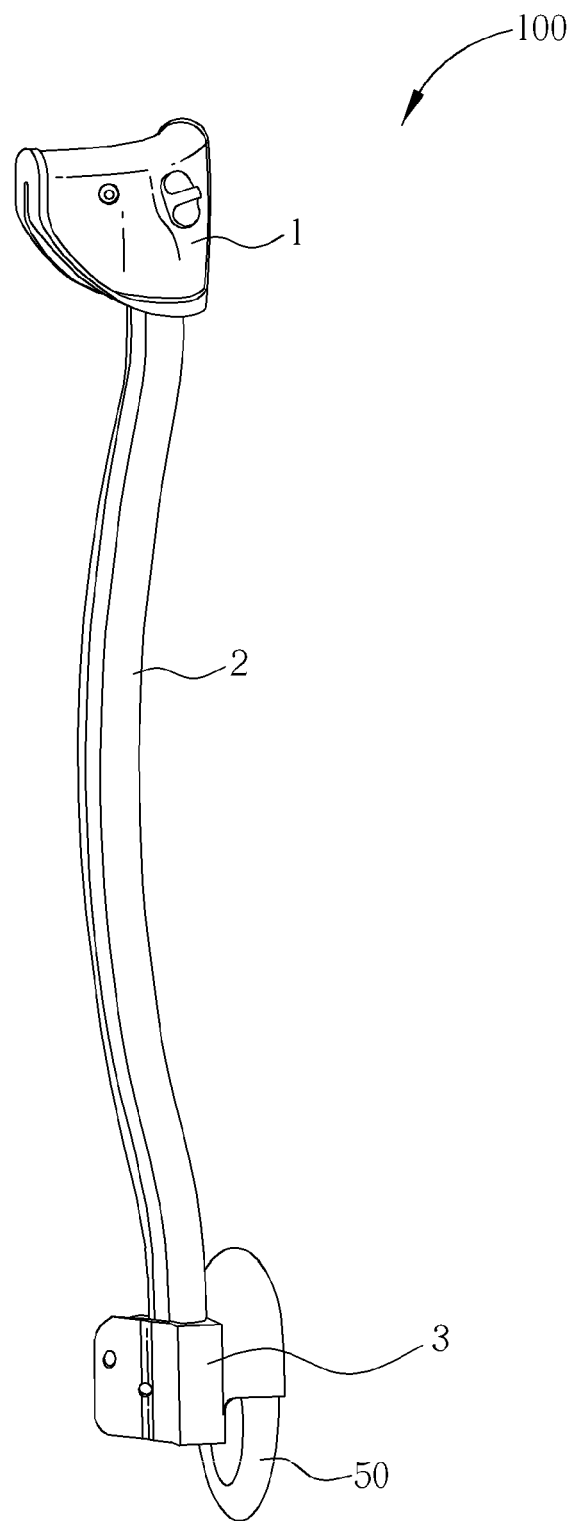
FIG. 1 is an illustration of a braking device according to the present invention configured on a standing post and a wheel of a playard.
Figure 5:
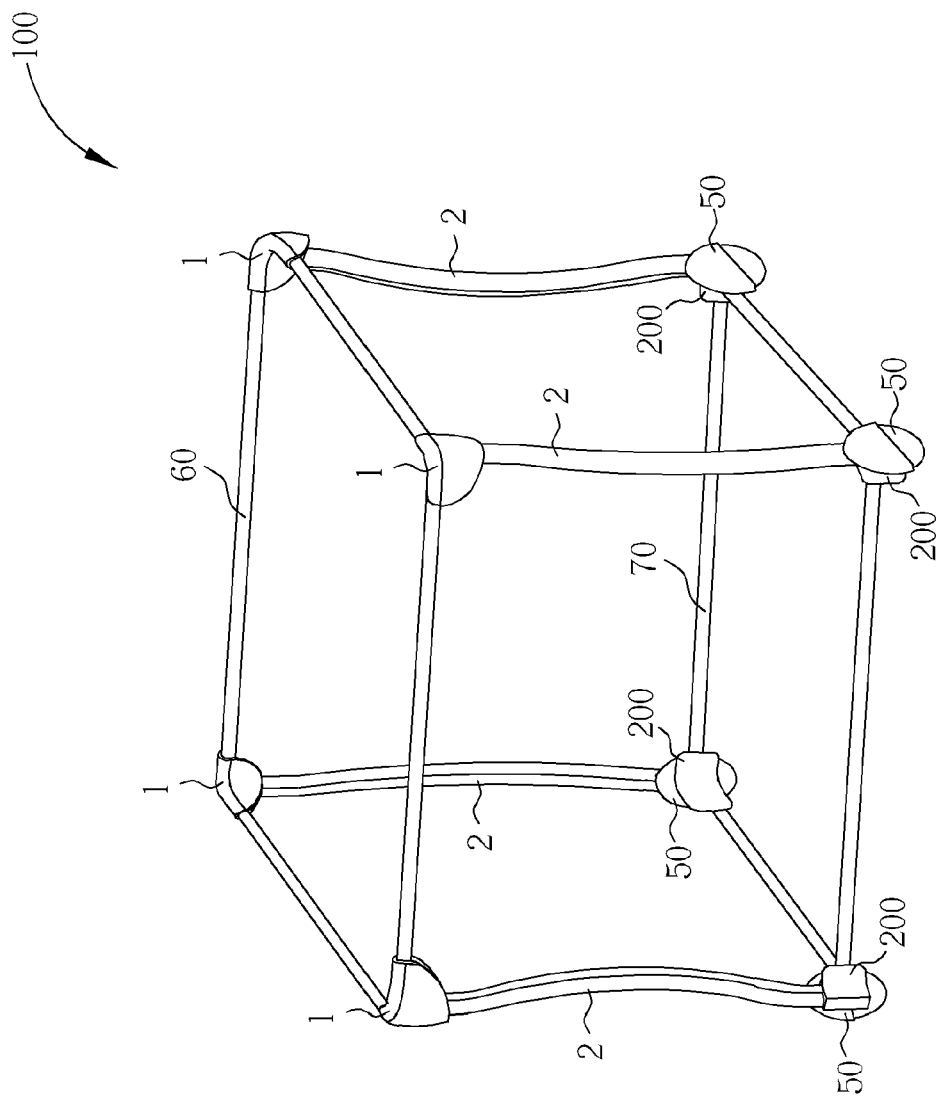
FIG. 5 is an illustration of the playard according to the present invention.

The present invention configures the operative part, or a sliding button in the embodiment, at a top corner or other place of a playard, so that the operator can stand to operate with the sliding button in a remote way, to brake the braking device or release the braking device. The operation of the braking device can therefore be simpler and easier. Please refer to FIG. 1. FIG. 1 is an illustration of the braking device together with a standing post 2 and a wheel 50 of the playard 100 where the braking device is mounted. Please also refer to FIG. 5, which is an illustration showing the playard 100. The playard 100 includes a top frame 60, a bottom frame 70, and a plurality of standing posts 2. Each standing post 2 connects between the top frame 60 and the bottom frame 70 and has a top corner 1 at the top end that connects to the top frame 60. At the bottom end of each standing post 2 is mounted with a wheel 50 so that the playard 100 can move. To prevent the playard 100 from moving away unintentionally, a braking device 200 configured on the corresponding wheel 50 can be operated to engage with the wheel 50 that prevents the wheel 50 from rotating arbitrarily.

Figure 2:
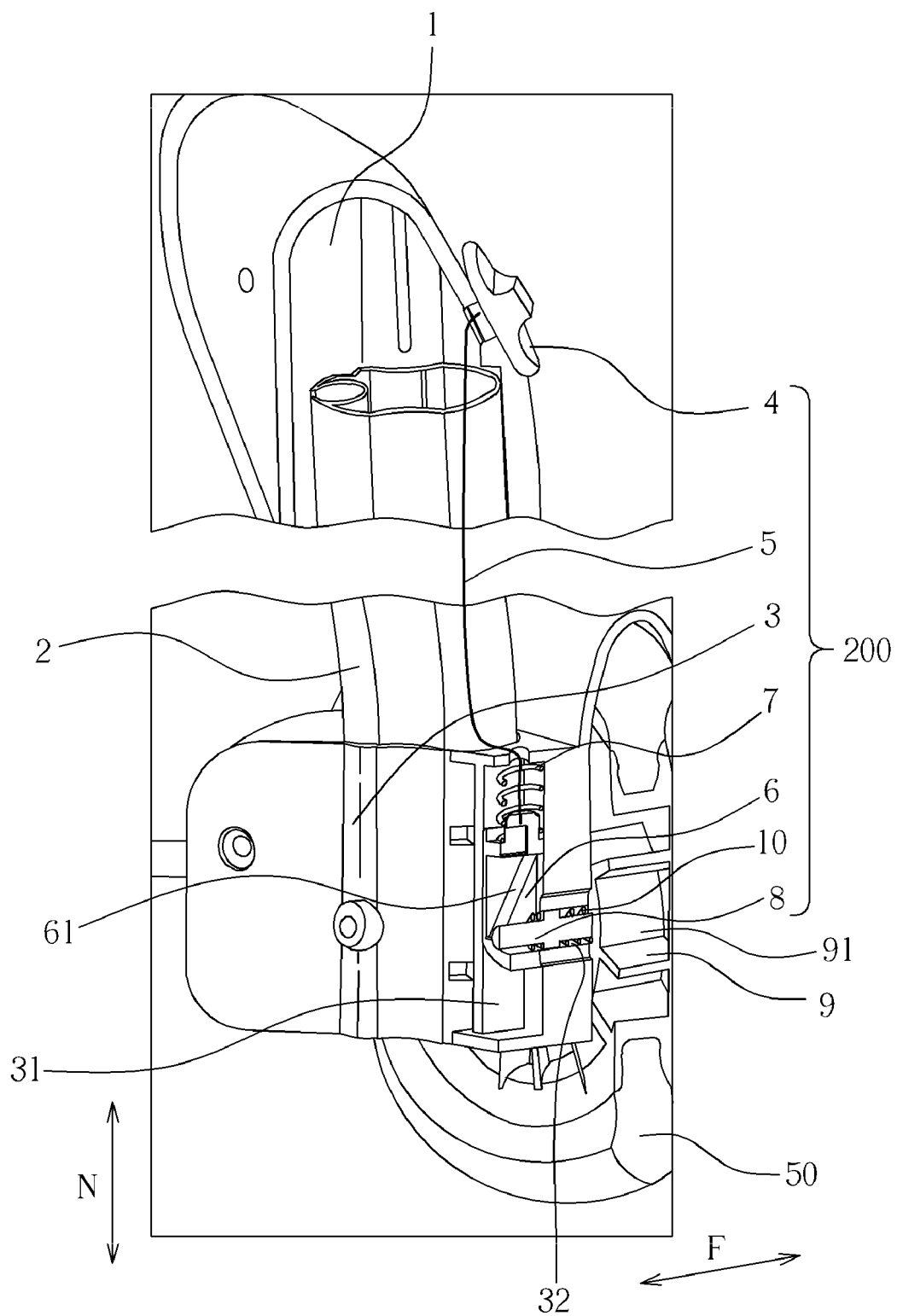
FIG. 2 is an illustration of the braking device in a releasing position.

Please refer to FIG. 2. FIG. 2 shows an illustration of the braking device 200 that is applied on the playard 100 and the braking device 200 is set in a releasing position. The braking device 200 includes a seat 3, a control unit 4, a linking unit 5, a slider 6, a first spring 7, a braking pin 8, and a second spring 10 wherein the linking unit 5 can be a steel wire and the control unit 4 can be a sliding button in this embodiment. The control unit 4 is configured at the top corner 1 and capable of sliding upward and downward relative to the top corner 1. In other embodiments, the control unit 4 can also be configured at any other places of the playard 100 remote from the wheel 50 but conveniently operable for the user. For example, the control unit 4 can be configured at the top frame 60 or at the top end of one standing post 2. In the embodiment, the control unit 4 can slide upward relative to the top corner 1 to an unlocking position or downward relative to the top corner 1 to a locking position and FIG. 2 shows that the control unit 4 slides upward relative to the top corner 1 to the unlocking position. The linking unit 5 passes through the standing post 2 and connects to the control unit 4 with one end and to the slider 6 with the other end. The slider 6, the first spring 7, the braking pin 8, and the second spring 10 are all configured inside the seat 3. The seat 3 is configured at the bottom end of the standing post 2 of the playard 100 and connected with the wheel 50. Inside the seat 3 has a first channel 31 by which the slider 6 locates within and the slider 6 is capable of sliding up and down relative to the seat 3 along a direction N. The first spring 7 is configured in the first channel 31 and mounted between the seat 3 and the slider 6. When the slider 6 slides upward in the first channel 31 as shown in FIG. 2, the first spring 7 is compressed by the slider 6 and the seat 3 and has bias force downward along direction N. The seat 3 further has a second channel 32 lying along a direction F and in this embodiment, the second channel 32 is space communicated with the first channel 31 and is perpendicular to the first channel 31. The braking pin 8 is configured in the second channel 32 and capable of sliding left or right relative to the seat 3 along direction F. The second spring 10 is configured in the second channel 32 and mounted between the seat 3 and the braking pin 8. When the braking pin 8 slides leftward in the second channel 32 as shown in FIG. 2, the second spring 10 is compressed by the braking pin 8 and the seat 3 and has bias force rightward along direction F.

Figure 3:
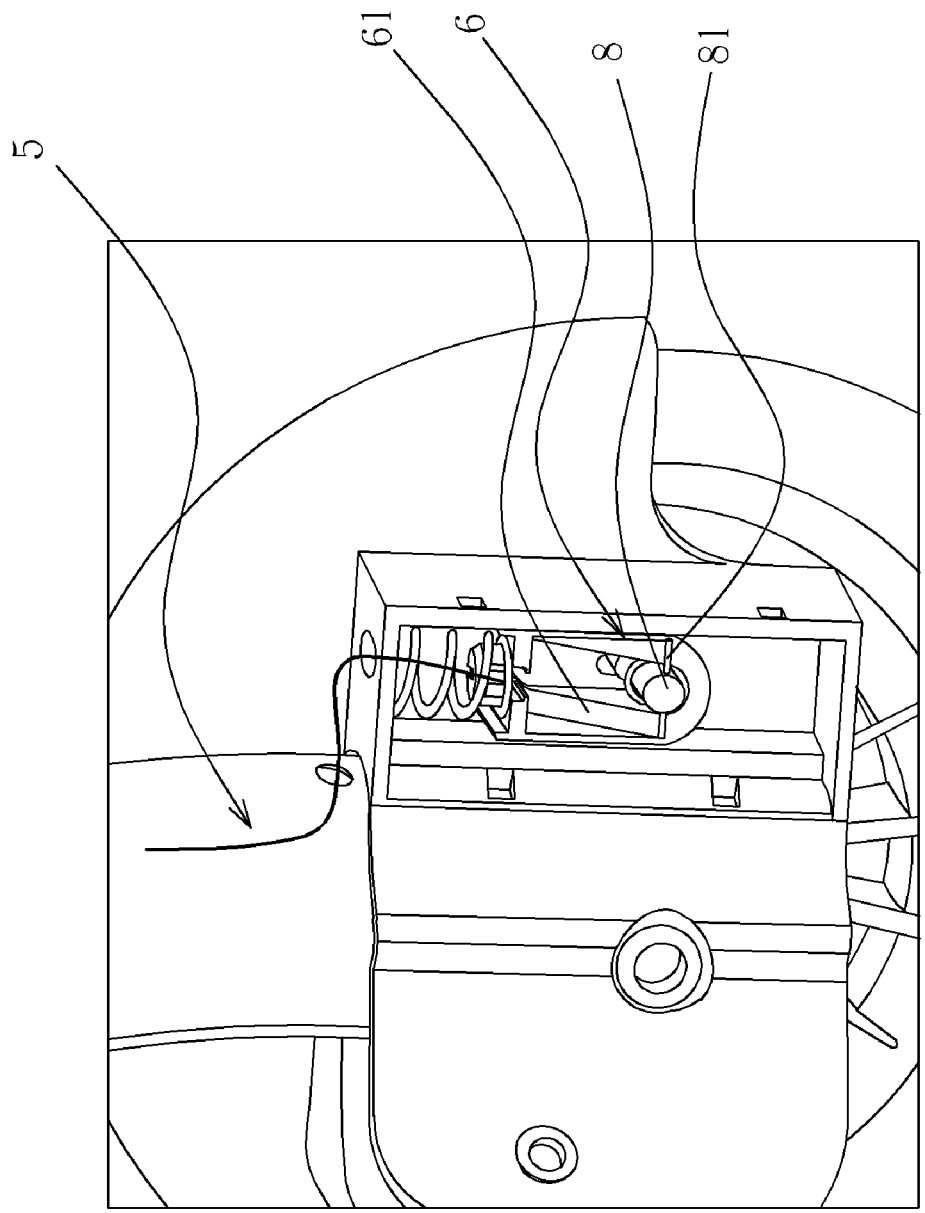
FIG. 3 is an illustration of another view of the braking device in FIG. 2.

Please also refer to FIG. 3. FIG. 3 shows an alternative angle of view of the braking device 200 when in the releasing position. The slider 6 further has an inclined surface 61 and the braking pin 8 further has a protruding head 81 that can abut against the inclined surface 61 and slide thereon. The protruding head 81 may be formed by a transverse rod that protrudes from an end of the braking pin 8. When the braking device 200 is in the releasing position as shown in FIG. 2, the braking pin 8 is away from the hub 9 of the wheel 50, at which position both the first spring 8 and the second spring 10 are in the compressed state.

Figure 4:
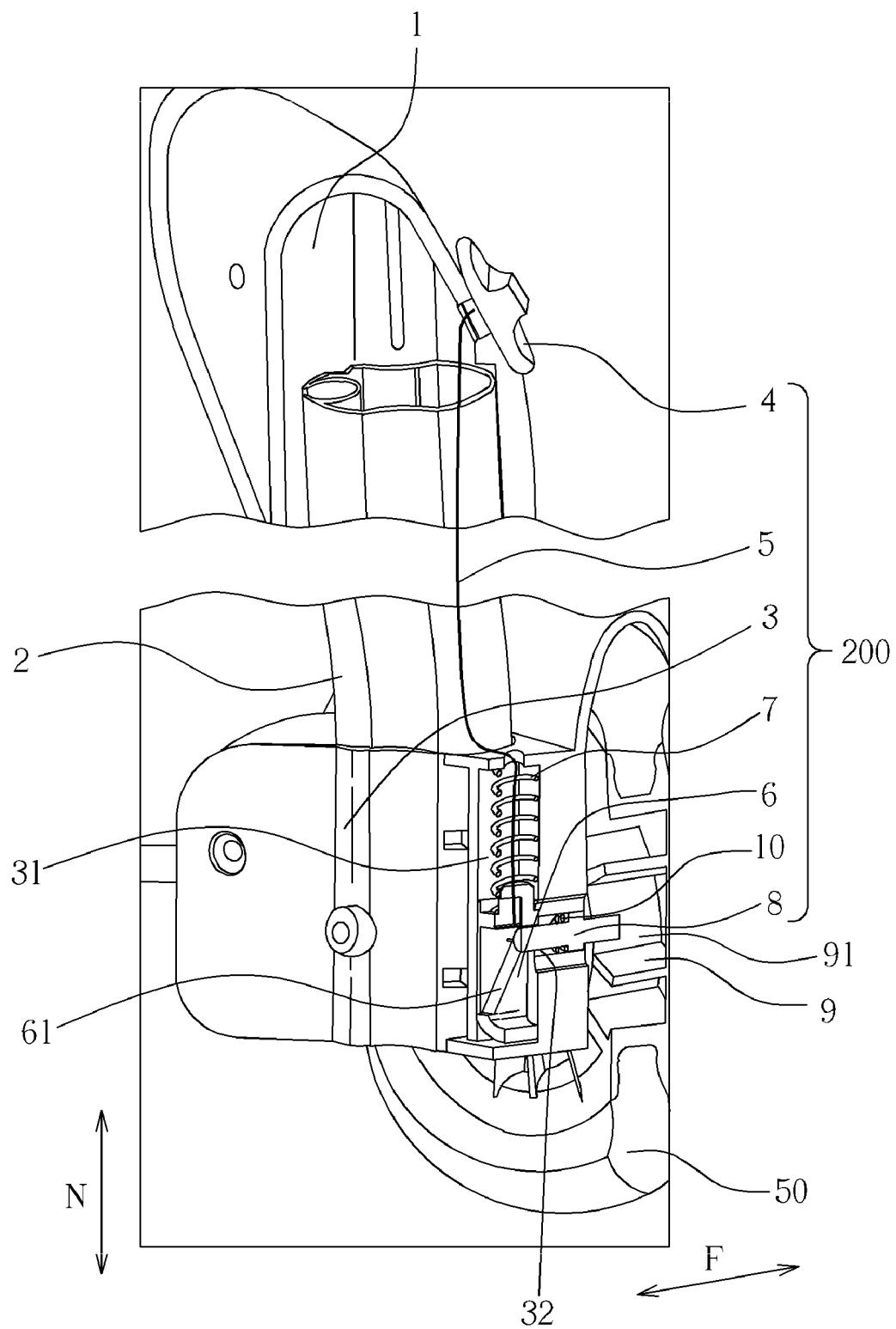
FIG. 4 is an illustration of the braking device in a braking position.

Please refer to FIG. 4. FIG. 4 is an illustration showing that the braking device 200 is in the locking position. In order to apply braking to the wheel 50, user can push the control unit 4 downward relative to the top corner 1 so as to cause the bias force of the first spring 7 moving the slider 6 to slide downward relative to the seat 3 along direction N and the braking pin 8 is consequently free to slide rightward along direction F because of the bias force of the second spring 10, and then the braking pin 8 is moved to slide rightward relative to the seat 3 along direction F until the braking pin 8 engages with one of the slots 91 on the hub 9 of the wheel 50. The wheel 50 is locked now. Additionally, if the braking pin 8 can not engage with any of the slots 91 on the hub 9 because of misalignment when the sliding button 4 moves downward to the locking position on the top corner 1, the second spring 10 can still be kept in the compressed status and the operation of the control unit 4 may not be interrupted or effected. As long as the wheel 50 rotates to a position that one of the slots 91 on the hub 9 is aligned with the braking pin 8, the compressed second spring 10 then automatically biases the braking pin 8 into the slot 91 along direction F and the wheel 50 can be braked.

For releasing the braking, user can push the control unit 4, which is in the locking position in FIG. 4, upward relative to the top corner 1 so as to cause the linking unit 5 to move the slider 6 to slide upward along direction N. Meanwhile, the inclined surface 61 on the slider 6 brings the protruding head 81 and the braking pin 8 to slide leftward along direction F. The braking pin 8 then disengages from the one of the slots 91 on the hub 9 and the wheel 50 is released. A retainer, which is not shown in the figure, can further be applied on the top corner 1. When the control unit 4 moves upward to the unlocking position on the top corner 1, the retainer then keeps the control unit 4 at the position on the top corner 1 for resisting the bias force of the first spring 7 and the second spring 10 and keeping the braking device 200 in the releasing position. Additionally, the embodiment mentioned above utilizes the braking pin 8 in the braking device 200 to engage with one slot 91 of the hub 9 for braking the wheel 50. The way how the braking device 200 works according to the present invention, however, shall not be confined by such type of engagement as described above. The main spirit of the present invention deals with remote controllability of the braking device 200 by operating the control unit 4, which locates remove from the slider 6, the braking pin 8, and the wheel 50. The braking pin 8 and the slots 91 on the hub 9 and their engagement relation can certainly be replaced by other types of components and engagement and still be in the scope of the present invention.

The present invention discloses a remote braking device that can be applied on a playard. The control unit is slidably mounted on the top corner of the playard and connected to the slider inside the seat through a linking unit which is passed through the standing post of the playard. When the control unit pulls the slider to move relative to the seat along a first direction, the braking pin slides relative to the seat along a second direction and disengages from the hub to release the wheel. When the control unit is pushed to lock the wheel, the bias force from the springs moves the slider and the braking pin to slide along the opposite direction, leading the braking pin to engage with the hub to brake the wheel. The wheel can be operated to brake or release by a remote control unit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A braking device for a playard that has a standing post, the braking device comprising:
    a seat mounted at the bottom end of the standing post, a wheel of the playard being rotatably connected to the seat;
    a first elastic element;
    an engaging unit mounted at the seat and capable of moving between a releasing position and a braking position relative to the seat, the engaging unit comprising:
        a slider movably mounted at the seat and capable of moving along a first direction relative to the seat, the first elastic element configured between the slider and the seat; and
        a braking pin movably mounted at the seat and capable of moving along a second direction relative to the seat, one end of the braking pin abutting against the slider when the slider moves along the first direction, and the braking pin is brought to move along the second direction by the slider;
    a control unit configured at a place of the playard remote from the seat and selectively set in an unlocking position or a locking position; and
    a linking unit passing through the standing post of the playard and connecting to the engaging unit and the control unit with its two ends respectively;
    wherein when the control unit is moved to the locking position, the engaging unit is brought to the braking position for engaging with the wheel via the linking unit; when the control unit is moved to the unlocking position, the engaging unit is brought to the releasing position for disengaging from the wheel via the linking unit.

2. The braking device of claim 1, wherein the linking unit connects to the slider and the control unit with its two ends respectively.

3. The braking device of claim 1, wherein the slider comprises an inclined surface and the end of braking pin forms with a protruding head for abutting against the inclined surface and sliding on the inclined surface such that the braking pin can be moved along the second direction.

4. The braking device of claim 1, wherein the hub of the wheel of the playard comprises a plurality of slots and the braking pin is engaged with one of the plurality of slots to lock the wheel.

5. The braking device of claim 1, further comprising a second elastic element configured between the braking pin and the seat.

6. The braking device of claim 5, wherein the first elastic element and the second elastic element are springs.

7. The braking device of claim 1, wherein the linking unit is a steel wire.

8. The braking device of claim 1, wherein the playard comprises a top corner at the top end of the standing post, the control unit being slidably mounted at the top corner.

9. A playard comprising:
a standing post;
a wheel;
a braking device comprising:
  a seat mounted at the bottom end of the standing post, the wheel being rotatably connected to the seat;
  an engaging unit mounted at the seat and capable of moving between a releasing position and a braking position relative to the seat;
  a control unit selectively set in an unlocking position or a locking position; and
  a linking unit passing through the standing post and connecting to the engaging unit and the control unit with its two ends respectively; and
a top corner, configured at the top end of the standing post, the control unit being slidably mounted at the top corner;
wherein when the control unit is moved to the locking position, the engaging unit is brought to the braking position for engaging with the wheel via the linking unit; when the control unit is moved to the unlocking position, the engaging unit is brought to the releasing position for disengaging from the wheel via the linking unit.

10. The playard of claim 9, wherein the braking device further comprises
a first elastic element and the engaging unit comprises:
a slider movably mounted at the seat and capable of moving along a first direction relative to the seat, the first elastic element configured between the slider and the seat; and
a braking pin movably mounted at the seat and capable of moving along a second direction relative to the seat, one end of the braking pin abutting against the slider when the slider moves along the first direction, and the braking pin is brought to move along the second direction by the slider.

11. The playard of claim 10, wherein the linking unit connects to the slider and the control unit with its two ends respectively.

12. The playard of claim 10, wherein the slider comprises an inclined surface and the end of braking pin forms with a protruding head for abutting against the inclined surface and sliding on the inclined surface such that the braking pin can be moved along the second direction.

13. The playard of claim 10, wherein the hub of the wheel comprises a plurality of slots and the braking pin is engaged with one of the plurality of slots to lock the wheel.

14. The playard of claim 10, wherein the braking device further comprises a second elastic element configured between the braking pin and the seat.

15. The playard of claim 14, wherein the first elastic element and the second elastic element are springs.

16. The playard of claim 9, wherein the linking unit is a steel wire.

17. A playard comprising:
a standing post;
a wheel; and
a braking device comprising:
  a seat mounted at the bottom end of the standing post, the wheel being rotatably connected to the seat;
  a first elastic element;
  an engaging unit mounted at the seat and capable of moving between a releasing position and a braking position relative to the seat, the engaging unit comprising:
    a slider movably mounted at the seat and capable of moving along a first direction relative to the seat, the first elastic element configured between the slider and the seat; and
    a braking pin movably mounted at the seat and capable of moving along a second direction relative to the seat, one end of the braking pin abutting against the slider when the slider moves along the first direction, and the braking pin is brought to move along the second direction by the slider;
  a control unit configured at a place of the playard remote from the seat and selectively set in an unlocking position or a locking position; and
  a linking unit passing through the standing post and connecting to the engaging unit and the control unit with its two ends respectively;
wherein when the control unit is moved to the locking position, the engaging unit is brought to the braking position for engaging with the wheel via the linking unit; when the control unit is moved to the unlocking position, the engaging unit is brought to the releasing position for disengaging from the wheel via the linking unit.

18. The playard of claim 17, further comprising a top corner at the top end of the standing post, the control unit being movably mounted at the top corner.

19. The playard of claim 17, wherein the slider comprises an inclined surface and the end of braking pin forms with a protruding head for abutting against the inclined surface and sliding on the inclined surface such that the braking pin can be moved along the second direction.

20. The playard of claim 17, wherein the braking device further comprises a second elastic element configured between the braking pin and the seat.

* * * * *